United States Patent
Nishikawa (10) Patent No.: US 9,207,896 B2
(45) Date of Patent: Dec. 8, 2015

(54) PRINTING APPARATUS, METHOD AND COMPUTER-READABLE STORAGE MEDIUM HAVING A DATA REQUEST TO A SERVER BEFORE RECEPTION OF A PRINT INSTRUCTION

(71) Applicant: BROTHER KOGYO KABUSHIKI KAISHA, Nagoya-shi, Aichi-ken (JP)

(72) Inventor: Naoki Nishikawa, Nagoya (JP)

(73) Assignee: BROTHER KOGYO KABUSHIKI KAISHA, Nagoya-Shi, Aichi-ken (JP)

( * ) Notice: Subject to any disclaimer, the term of this patent is extended or adjusted under 35 U.S.C. 154(b) by 0 days.

(21) Appl. No.: 14/287,359

(22) Filed: May 27, 2014

(65) Prior Publication Data

US 2014/0355056 A1    Dec. 4, 2014

(30) Foreign Application Priority Data

May 28, 2013 (JP) ................................. 2013-111929

(51) Int. Cl.
*G06F 3/12* (2006.01)

(52) U.S. Cl.
CPC ............ *G06F 3/1288* (2013.01); *G06F 3/1212* (2013.01); *G06F 3/1236* (2013.01); *G06F 3/1267* (2013.01); *G06F 3/1268* (2013.01)

(58) Field of Classification Search
CPC ... G06F 3/1212; G06F 3/1237; G06F 3/1253; G06F 3/1271; G06F 3/1285
USPC .......................................... 358/1.15; 399/81
See application file for complete search history.

(56) References Cited

U.S. PATENT DOCUMENTS

| 2002/0030849 A1* | 3/2002 | Takamiya .................... 358/1.15 |
| 2007/0081186 A1* | 4/2007 | Numata ...................... 358/1.15 |

FOREIGN PATENT DOCUMENTS

| JP | 2003-283755 A | 10/2003 |
| JP | 2004-348652 A | 12/2004 |
| JP | 2007-105937 A | 4/2007 |

\* cited by examiner

*Primary Examiner* — Martin Mushambo
(74) *Attorney, Agent, or Firm* — Scully, Scott, Murphy & Presser, P.C.

(57) ABSTRACT

A first request is transmitted to a server. Connection is established between a printing apparatus and the server. A second request is transmitted to the server. Image data is received based on the second request and stored in a first memory. It is determined whether image data stored in the first memory includes image data for which a print instruction is received. When the image data stored in the first memory is included in the image data for which the print instruction is received, printing is performed based on the image data stored in the first memory. When the image data stored in the first memory is not included in the image data for which the print instruction is received, a third request is transmitted to the server, and printing is performed based on the image data for which the print instruction is received, after receiving the image data from the server.

18 Claims, 10 Drawing Sheets

PRINTING APPARATUS, METHOD AND COMPUTER-READABLE STORAGE MEDIUM HAVING A DATA REQUEST TO A SERVER BEFORE RECEPTION OF A PRINT INSTRUCTION

CROSS REFERENCE TO RELATED APPLICATIONS

This application claims priority from Japanese Patent Application No. 2013-111929 filed May 28, 2013. The entire content of the priority application is incorporated herein by reference.

TECHNICAL FIELD

The invention relates to a printing apparatus and the like.

BACKGROUND

Conventionally, in a printing system having a printing apparatus and a server, technology is known that a download request of image data is outputted from a printing apparatus to a server, the image data is downloaded from the server, and the printing apparatus performs printing based on the image data. Hereinafter, printing in accordance with the above-described procedure will be referred to as "download printing".

In technology relating to the download printing, for example, print jobs are preliminarily stored in a server, a user selects, through an operation panel of a printing apparatus, a print job to be printed from among the print jobs stored in the server, and the selected print job is downloaded to the printing apparatus and is printed.

SUMMARY

In the above-described technology, however, after a selection instruction of image data is inputted, downloading of selected image data is started, and printing of downloaded image data is started. Hence, waiting time of the user before start of printing is long.

In view of the foregoing, according to one aspect, the invention provides a printing apparatus. The printing apparatus includes an interface, a first memory, a printing device, a processor, and a second memory storing instructions. The printing device is configured to perform printing based on image data stored in the first memory. When executed by the processor, the instructions cause the processor to perform: transmitting a first request to a server via the interface, the first request requesting the server to connect with the printing apparatus; establishing connection between the printing apparatus and the server; transmitting a second request to the server via the interface, the second request requesting the server to transmit image data stored in the server after connection with the server and before reception of a print instruction, the print instruction being an instruction for receiving image data stored in the server and for controlling the printing device to perform printing based on the image data; receiving image data stored in the server via the interface based on the second request; storing the received image data in the first memory; receiving the print instruction via the interface; determining whether the image data stored in the first memory is included in the image data for which the print instruction is received; in response to determination that the image data stored in the first memory is included in the image data for which the print instruction is received, controlling the printing device to perform printing based on the image data stored in the first memory; and in response to determination that the image data stored in the first memory is not included in the image data for which the print instruction is received, transmitting a third request to the server via the interface, the third request requesting the server to transmit the image data for which the print instruction is received, and controlling the printing device to perform printing based on the image data for which the print instruction is received, after receiving the image data from the server.

According to another aspect, the invention also provides a method of controlling a printing apparatus to perform printing based on image data stored in a server. The printing apparatus has an interface, a memory, and a printing device. The method includes: transmitting a first request to the server via the interface, the first request requesting the server to connect with the printing apparatus; establishing connection between the printing apparatus and the server; transmitting a second request to the server via the interface, the second request requesting the server to transmit image data stored in the server after connection with the server and before reception of a print instruction, the print instruction being an instruction for receiving image data stored in the server and for controlling the printing device to perform printing based on the image data; receiving image data stored in the server via the interface based on the second request; storing the received image data in the memory; receiving the print instruction via the interface; determining whether the image data stored in the memory is included in the image data for which the print instruction is received; in response to determination that the image data stored in the memory is included in the image data for which the print instruction is received, controlling the printing device to perform printing based on the image data stored in the memory; and in response to determination that the image data stored in the memory is not included in the image data for which the print instruction is received, transmitting a third request to the server via the interface, the third request requesting the server to transmit the image data for which the print instruction is received, and controlling the printing device to perform printing based on the image data for which the print instruction is received, after receiving the image data from the server.

According to still another aspect, the invention also provides a non-transitory computer-readable storage medium storing computer-readable instructions executable by a processor of a printing apparatus connected with a server. The printing apparatus has an interface, a memory, and a printing device. When executed by the processor, the computer-readable instructions cause the processor to perform: transmitting a first request to the server via the interface, the first request requesting the server to connect with the printing apparatus; establishing connection between the printing apparatus and the server; transmitting a second request to the server via the interface, the second request requesting the server to transmit image data stored in the server after connection with the server and before reception of a print instruction, the print instruction being an instruction for receiving image data stored in the server and for controlling the printing device to perform printing based on the image data; receiving image data stored in the server via the interface based on the second request; storing the received image data in the memory; receiving the print instruction via the interface; determining whether the image data stored in the memory is included in the image data for which the print instruction is received; in response to determination that the image data stored in the memory is included in the image data for which the print instruction is received, controlling the printing device to perform printing based on the image data stored in the memory;

and in response to determination that the image data stored in the memory is not included in the image data for which the print instruction is received, transmitting a third request to the server via the interface, the third request requesting the server to transmit the image data for which the print instruction is received, and controlling the printing device to perform printing based on the image data for which the print instruction is received, after receiving the image data from the server.

BRIEF DESCRIPTION OF THE DRAWINGS

Embodiments in accordance with the invention will be described in detail with reference to the following figures wherein.

DETAILED DESCRIPTION

A printing apparatus according to an embodiment of the invention will be described while referring to the accompanying drawings. In the present embodiment, the invention is applied to a multifunction peripheral (MFP) having an image forming function.

Figure 1:
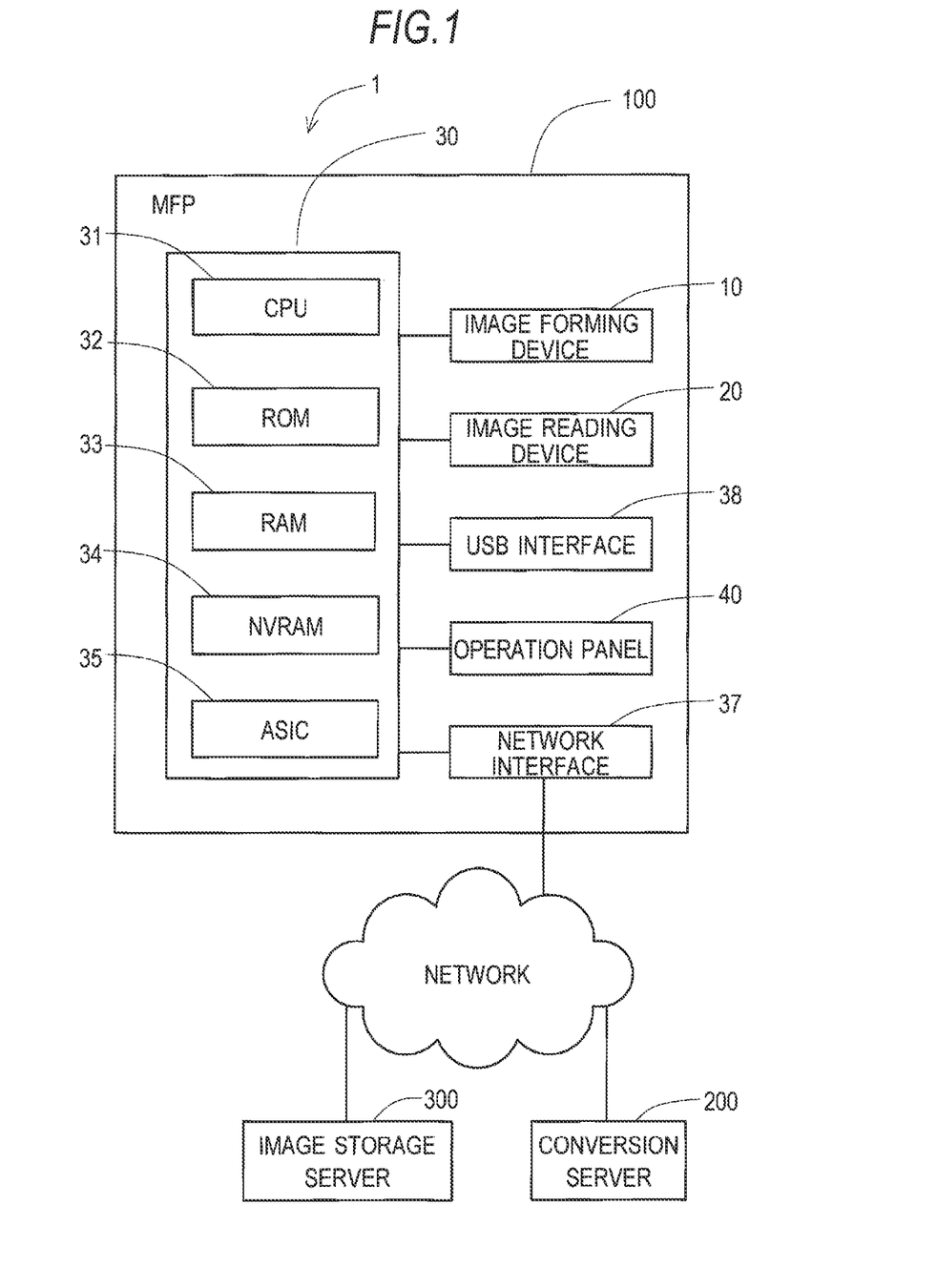
FIG. 1 is a block diagram showing a printing system including an MFP according to an embodiment.

As shown in FIG. 1, a printing system 1 of the present embodiment includes an MFP 100, a conversion server 200, and an image storage server 300, which can communicate with each other through a network such as Internet. The conversion server 200 is an external device that performs a conversion process of image data, for example. The image storage server 300 is an external device that stores image data, for example. Each of the conversion server 200 and the image storage server 300 is an example of a server.

The MFP 100 receives, through the network, image data form the conversion server 200 or the image storage server 300, and stores the received image data. Further, the MFP 100 has a function of performing printing based on the stored image data. The MFP 100 can also receive image data with a print command from a PC or the like and perform printing. Also, the MFP 100 can directly receive an instruction input such as a copy instruction through an operation panel or the like, and can perform printing.

The conversion server 200 has a function of transmitting and receiving image data, and a function of converting image data that cannot be analyzed by the MFP 100 into data of a type that can be analyzed by the MFP 100. The image storage server 300 has a function of storing various image data and a function of supplying stored image data through the network such as Internet. The conversion server 200 and the image storage server 300 may be realized by a single computer, a plurality of computers, a cloud system, or the like.

Note that image data stored in the image storage server 300 include data of various types. For example, the image data include PDF data, TIFF data, JPEG data, and the like. The image data also include text data and data specific to a certain application. The MFP 100 is capable of analyzing PDL data that has been converted by a device driver provided for the MFP 100 itself, postscript data, and so on. On the other hand, many of data of various types described above cannot be analyzed by the MFP 100. Hence, if the MFP 100 cannot analyze image data for which printing is instructed by the MFP 100 itself, the MFP 100 transmits the image data to the conversion server 200 to perform a conversion process, and receive image data after conversion from the conversion server 200.

Next, the electrical configuration of the MFP 100 will be described. As shown in FIG. 1, the MFP 100 has a main controller 30 including a CPU 31, a ROM 32, a RAM 33, an NVRAM (nonvolatile RAM) 34, and an ASIC 35. The MFP 100 also has an image forming device 10, an image reading device 20, a network interface 37, a USB interface 38, and an operation panel 40, which are electrically connected to the main controller 30.

The image forming device 10 is for printing an image on a sheet of paper. In the MFP 100 of the present embodiment, the image forming device 10 is a page printer of an electrophotographic type, for example. The image forming device 10 may be capable of forming a color image, or may be capable of forming only a monochromatic image. The image forming device 10 is an example of a printing device. The image reading device 20 is for reading (scanning) an image on an original document. The reading mechanism may be CCD or CIS. The image reading device 20 may be capable of reading a color image, or may be capable of reading only a monochromatic image.

The ROM 32 stores various control programs for controlling the MFP 100, various settings, default values, and the like. The RAM 33 is used as work areas to which various control programs are read out, or as storage areas in which received image data is stored temporarily until printing is finished.

The CPU 31 controls each element of the MFP 100, while storing the processing results in the RAM 33 and the NVRAM 34 in accordance with the control programs read out from the ROM 32. The CPU 31 is an example of a processor. Here, the main controller 30 may be a processor, or the ASIC 35 may be a processor. Note that the main controller 30 in FIG. 1 is a collective term including hardware used for controlling the MFP 100, such as the CPU 31. Thus, the main controller 30 does not necessarily mean a single hardware that is actually provided in the MFP 100.

The network interface 37 is hardware for performing communication with the network through a LAN cable or the like. The USB interface 38 is hardware for performing communication with an apparatus connected through a USB cable or the like. The network interface 37 and the USB interface 38 are an example of an interface. The operation panel 40 displays various kinds of information for a user, and receives an instruction input by the user.

Figure 2:
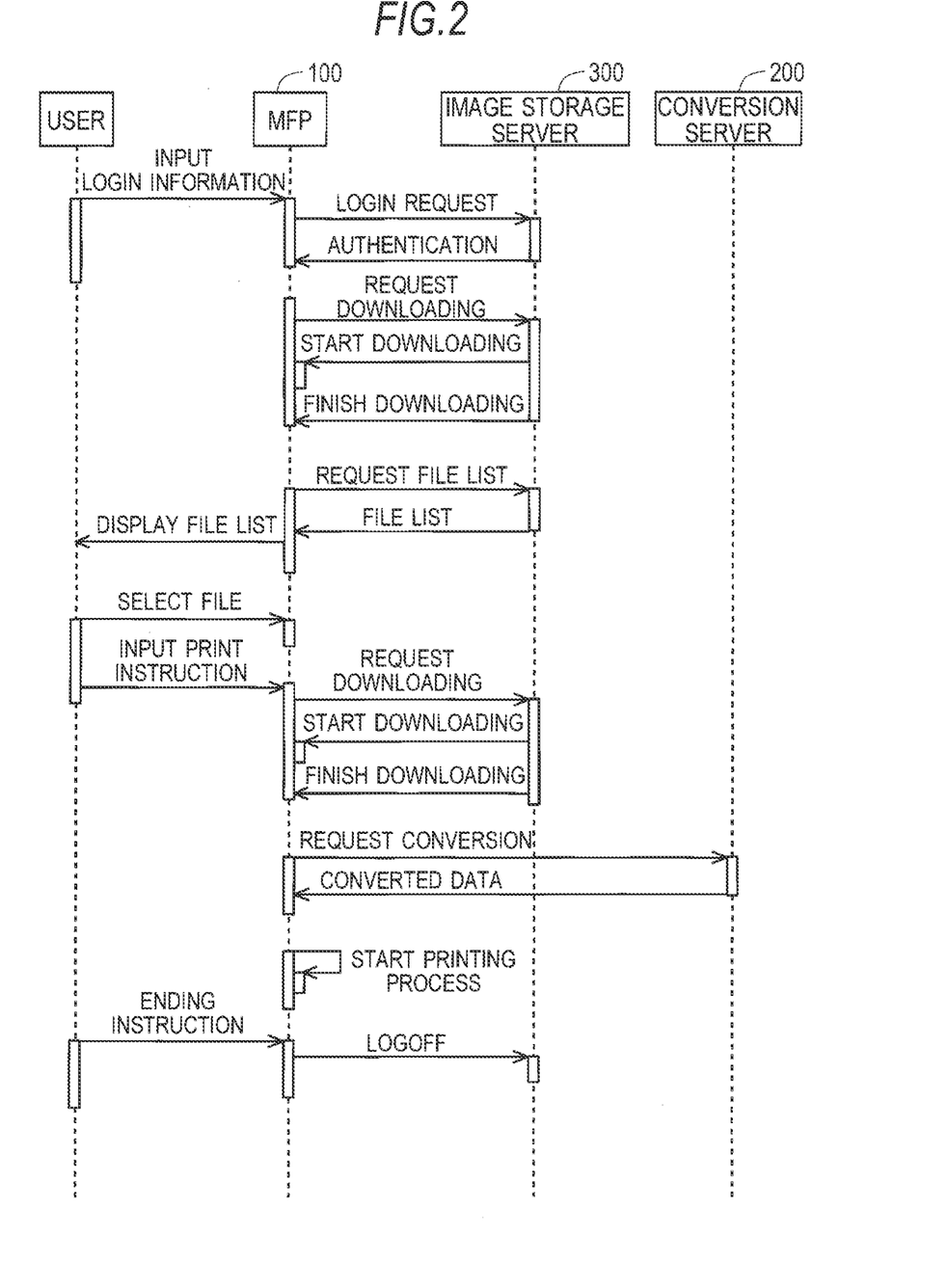
FIG. 2 is a sequence chart showing the procedure of first download printing.

Next, the procedure of download printing executed by the MFP 100 according to a first embodiment will be described while referring to the sequence chart of FIG. 2. In FIG. 2, the operations of each of the user, the MFP 100, the image storage server 300, and the conversion server 200 are shown in the sequence of execution from the upper side to the lower side along the vertical dashed lines. Further, the lateral arrows connecting the vertical dashed lines in FIG. 2 indicate directions in which information is transmitted.

The MFP 100 receives an input of login information for logging in to the image storage server 300 from a user wishing to perform download printing from the image storage server 300. For example, a combination of a user ID and a password is used as the login information.

The MFP 100 transmits the inputted login information to the image storage server 300 and requests authentication (login request). Then, the MFP 100 receives an authentication result from the image storage server 300. The MFP 100 can use files of an authenticated user, that is, files of a login user at the image storage server 300. That is, the MFP 100 establishes communication (connection) with the image storage server 300 by succeeding in a login. Transmission of login information is an example of an establishing process.

If communication with the image storage server 300 is established, the MFP 100 requests downloading of a file including image data. In the present embodiment, the MFP 100 requests downloading of all the files of the login user. The sequence of downloading the files may be a sequence of the date and time at which the files are updated, for example. That is, the file updated most recently is the first in the sequence of downloading. Based on a request by the MFP 100, downloading of files stored in the image storage server 300 is started. That is, in the printing system 1, downloading is started before reception of a print instruction of download printing described later. The MFP 100 stores image data downloaded from the image storage server 300.

Further, the MFP 100 requests the image storage server 300 to transmit a file list of files for which the login user has access authority. Then, the MFP 100 acquires the file list of image data from the image storage server 300, and controls the operation panel 40 to display the file list so as to receive the user's selection. The MFP 100 is capable of requesting the file list and displaying the file list in parallel with downloading of files, that is, while performing downloading of files.

Further, after displaying the file list, the MFP 100 receives an input of a print instruction by the login user. For example, the MFP 100 receives a press on a print button in a state where image data which is a target of download printing is selected in the file list displayed in the operation panel 40, thereby receiving the print instruction for performing download printing of the selected file. Here, the number of image data selected at the time of inputting the print instruction may be one or a plural number.

If a file of which preceding downloading has started matches file(s) selected by the print instruction, the MFP 100 can use downloaded data. That is, if downloading is completed, a printing process can be started immediately. If downloading is not completed yet, the MFP 100 continues downloading until completion and, upon completion of downloading, starts the printing process. In either way, because downloading of a file is started before receiving a print instruction, a printing process can be started in a short time, compared with a case where downloading of the file is started after receiving an input of the print instruction.

On the other hand, if a file of which preceding downloading has started is not included in files selected by the print instruction, the MFP 100 stops downloading that is in progress. Further, the MFP 100 deletes downloaded data of a file of which preceding downloading has been performed but has not been selected by the print instruction.

Further, the MFP 100 transmits, to the image storage server 300, a request for downloading a file of which preceding downloading has not been performed, out of files selected by the print instruction. Then, the MFP 100 starts a printing process based on image data of a file of which downloading is completed. Until a printing process is started for all the files selected by the print instruction, transmissions of "request downloading", "start downloading", "finish downloading", and a step of "start printing process" are performed repeatedly.

As described above, image data stored in the image storage server 300 may include data that cannot be printed by the MFP 100 as it is, and that requires conversion by the conversion server 200. Before starting execution of a printing process, the MFP 100 determines whether image data requires such conversion, based on a file extension or the like.

If image data selected for download printing requires conversion, the MFP 100 transmits a conversion request to the conversion server 200 after downloading is completed. Then, the MFP 100 transmits data downloaded from the image storage server 300 to the conversion server 200, and downloads data converted by the conversion server 200 from the conversion server 200. Upon completion of downloading from the conversion server 200, the MFP 100 starts a printing process based on downloaded image data. On the other hand, if image data selected for download printing does not require conversion, transmissions of information indicated as "REQUEST CONVERSION" and "CONVERTED DATA" in FIG. 2 are not performed.

Next, the procedure of a first download printing process executed by the MFP 100, which is a download printing process of the first embodiment, will be described while referring to the flowchart of FIG. 3. The first download printing process is executed by the CPU 31, triggered by establishment of communication between the MFP 100 and the image storage server 300.

Upon starting execution of the first download printing process, the CPU 31 first executes a preceding-downloading determining process for determining whether to start downloading (S101). The procedure of the preceding-downloading determining process executed in S101 will be described while referring to the flowchart of FIG. 4.

Figure 4:
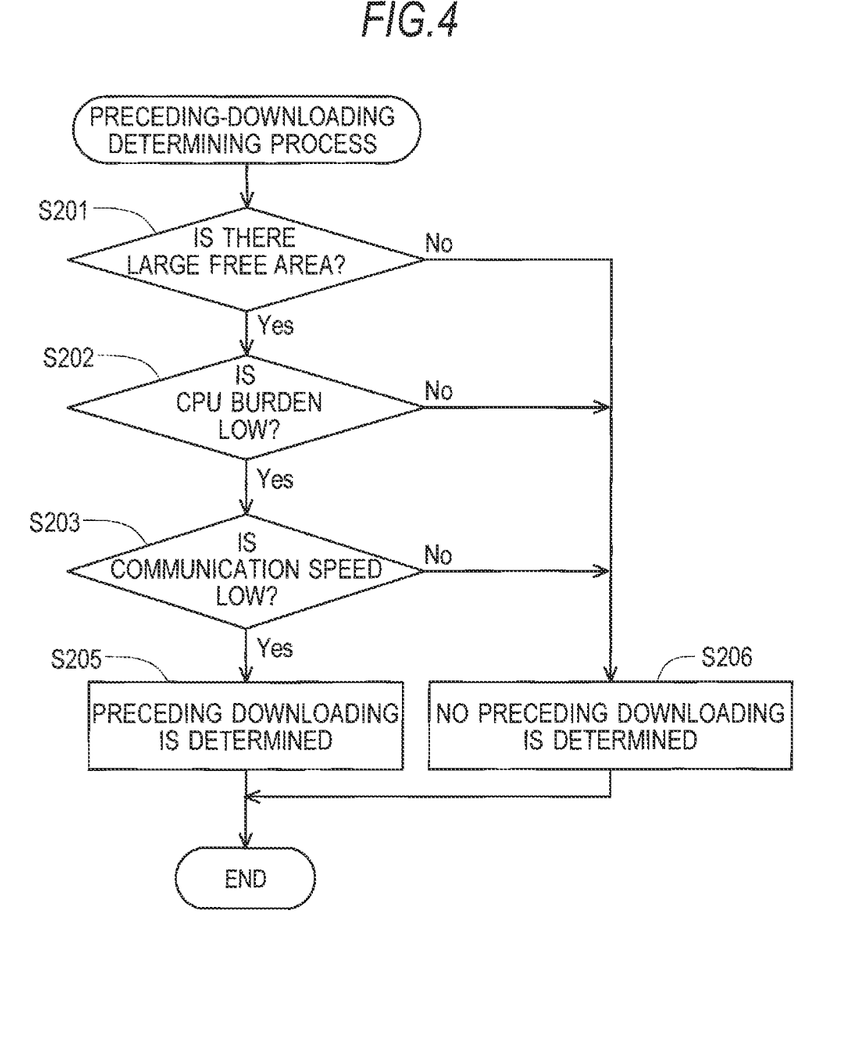
FIG. 4 is a flowchart showing the procedure of a preceding-downloading determining process.

Upon starting execution of the preceding-downloading determining process, the CPU 31 of the MFP 100 first determines whether there is large (or sufficient) free area in the RAM 33 (S201). For example, the CPU 31 determines whether the free area of the RAM 33 exceeds a limit free area that is preliminarily determined and stored. If the CPU 31 determines that the free area does not exceed the limit free area (S201: No), the CPU 31 determines that preceding downloading is not to be performed (no preceding downloading) (S206), and finishes the preceding-downloading determining process.

If preceding downloading is performed in a state where there is no sufficient free area in the RAM 33, a risk of memory overflow increases. Hence, if the free area is not sufficient, preceding downloading is not performed so as to reduce a risk of memory overflow. Here, the free area for which determination is made in S201 may be a physical free area of the RAM 33, or may be a free area of a specific storage area in the RAM 33 that is secured for storing image data.

On the other hand, if it is determined that there is large free area (S201: Yes), next, the CPU 31 determines whether a load of the CPU 31 is low (S202). For example, the CPU 31 determines whether the load of the CPU 31 is lower than a limit load that is preliminarily determined and stored. If it is determined that the load is not low (S202: No), the CPU 31 determines that preceding downloading is not to be performed (S206), and finishes the preceding-downloading determining process.

If preceding downloading is performed in a state where the load of the CPU 31 is high, there is a higher possibility that other processes are delayed. Hence, if the load is not low, preceding downloading is not performed so as to reduce a possibility that other processes are delayed. For example, the load of the CPU 31 may be a usage rate of the CPU 31, or may be the number of processes that are running.

On the other hand, if it is determined that the load is low (S202: Yes), next, the CPU 31 determines whether a communication speed between the MFP 100 and the image storage server 300 is low (S203). For example, the CPU 31 determines whether the communication speed is lower than a limit speed that is preliminarily determined and stored. If it is determined that the communication speed is not low (S203: No), the CPU 31 determines that preceding downloading is not to be performed (S206), and finishes the preceding-downloading determining process.

If preceding downloading is performed in a state where the communication speed is high, there is not much benefit of shortening waiting time of the user. Hence, it is preferable not to perform preceding downloading so as to avoid influences on other processes. Note that the communication speed may be obtained by actually measuring a speed at that time point, or may be determined from a speed in the past (history), or may be inferred based on performance of the image storage server 300, the type of interface, or the like.

On the other hand, if the communication speed is low (S203: Yes), the CPU 31 determines that preceding downloading is to be performed (S205), and finishes the preceding-downloading determining process. That is, preceding downloading is performed only if there is large free area in the RAM 33, the load of the CPU 31 is low, and the communication speed with the image storage server 300 is low.

Figure 3:
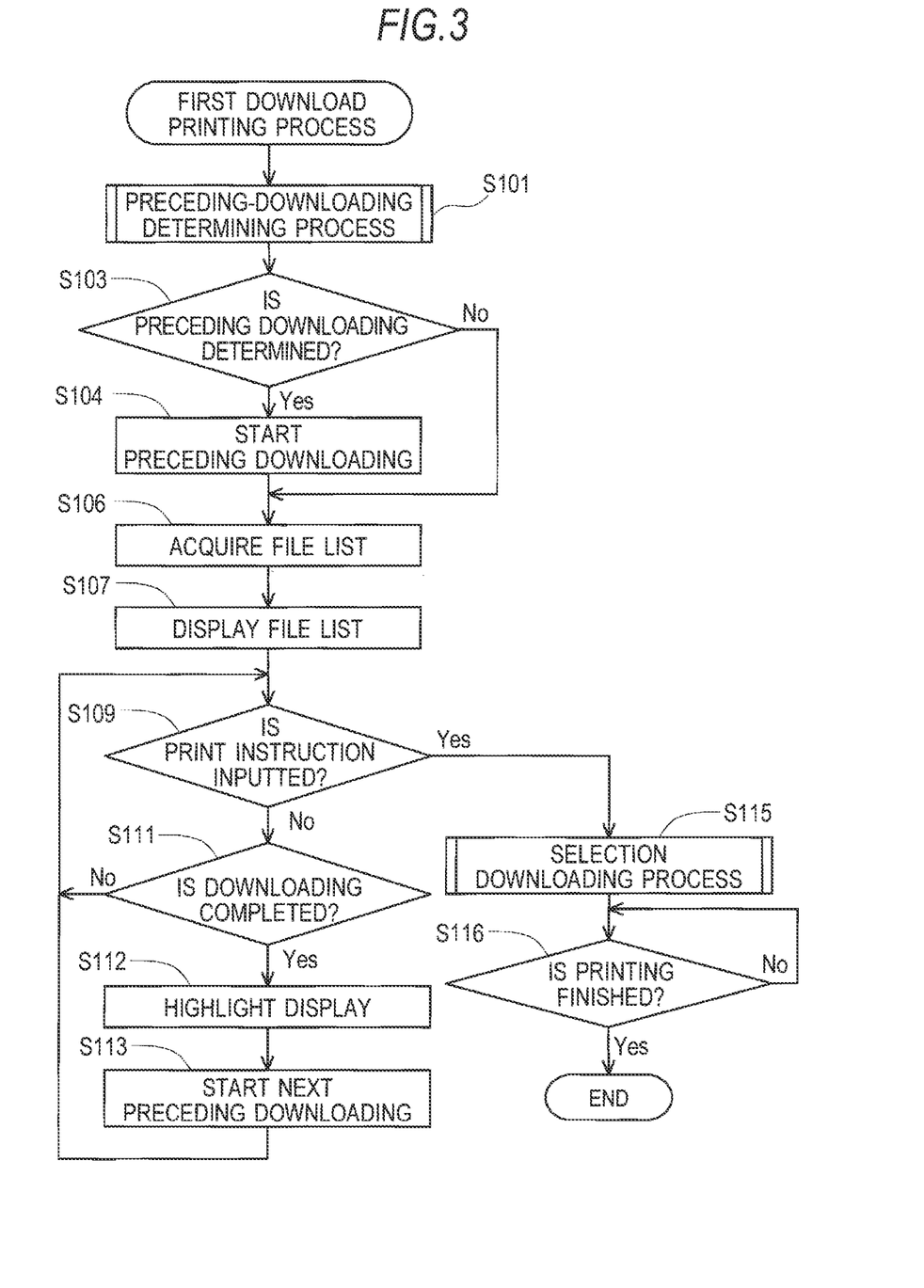
FIG. 3 is a flowchart showing the procedure of a first download printing process.

Returning to the first download printing process in FIG. 3, the CPU 31 determines whether it is determined in S101 that preceding downloading is to be performed (S103). If it is determined that preceding downloading is to be performed (S103: Yes), the CPU 31 starts preceding downloading (S104). That is, the CPU 31 transmits, to the image storage server 300, a request for starting downloading files of the login user. On the other hand, if it is determined in S101 that preceding downloading is not to be performed (S103: No), the CPU 31 does not start preceding downloading.

Next, in case of No in S103 or subsequent to S104, the CPU 31 acquires a file list of files of the login user from the image storage server 300 (S106). Further, the CPU 31 controls the operation panel 40 to display the acquired file list (S107). The mode of display is a thumbnail or a list, for example. Here, a file of which preceding downloading is started in S104 is likely to be included in the file list displayed in S107.

Subsequent to S107, the CPU 31 determines whether selection of a file and an input of a print instruction by the user have been received (S109). If an input of a print instruction has not been received (S109: No), the CPU 31 determines whether preceding downloading started in S104 is completed (S111). If preceding downloading is not completed (S111: No), the process returns to S109, and the CPU 31 repeats determinations in S109 and S111 until an input of a print instruction is received or until downloading of a file that is currently downloaded is completed. Note that, if preceding downloading is not performed, the CPU 31 determines in S111 that preceding downloading is not completed (S111: No).

If it is determined that preceding downloading is completed (S111: Yes), the CPU 31 displays a file of which downloading is completed, out of files in the file list displayed in S107, in a highlighted manner ("highlight display") (S112). Further, the CPU 31 starts preceding downloading of the next file (S113).

Figure 5:
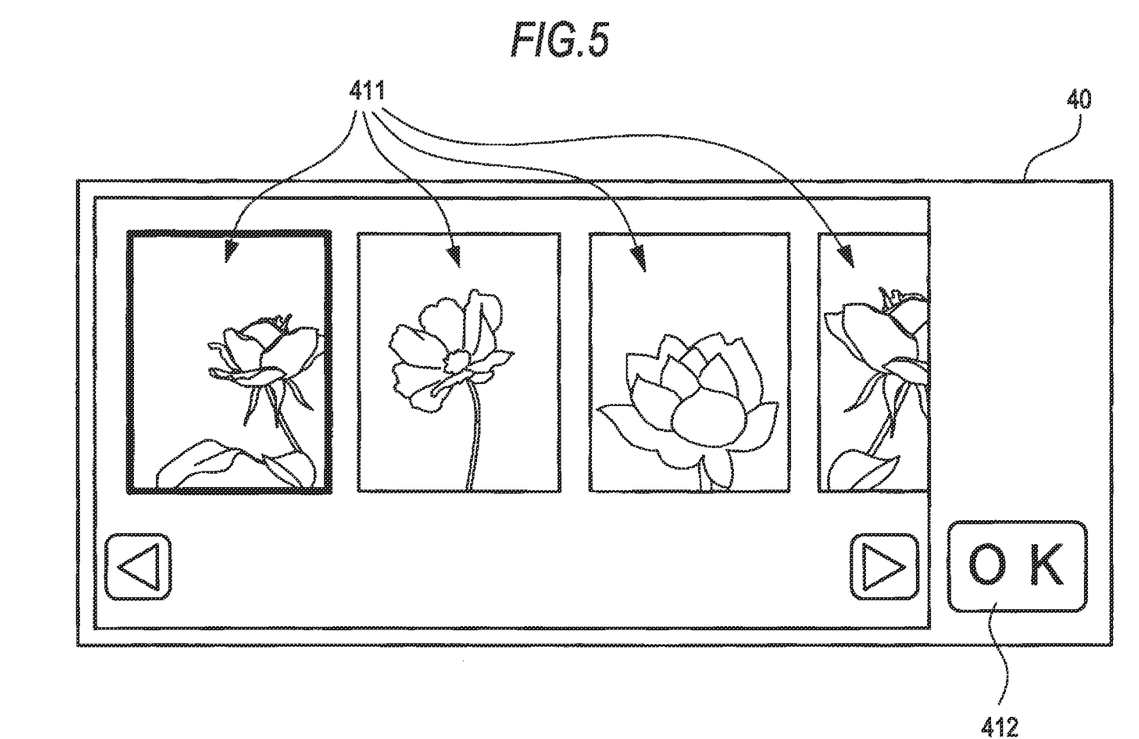
FIG. 5 is a screenshot showing an example of highlight display.

For example, the "highlight display" refers to displaying files of which downloading is completed, in an emphasized manner, in order to distinguish the files from other files of which downloading is not completed. Examples of "highlight display" include a thick frame, addition of a mark, change of color, and blinking. FIG. 5 shows an example of a file list including highlight display. This is an example in which a file list is shown by thumbnails. The operation panel 40 displays an OK button 412 and thumbnails 411 of a plurality of image data that can be selected as a print target. The image data shown at the left end of FIG. 5 is a file that is already downloaded and thus displayed by a thick frame. With this display method, the user can be notified of a progress state of downloading.

On the other hand, if an input of a print instruction has been received (S109: Yes), the CPU 31 executes a selection downloading process for downloading a selected file (S115). Here, the file that is selected at the time of receiving an input of a print instruction is referred to as "selection file" which is to be printed. Next, the procedure of a selection downloading process executed in S115 will be described while referring to the flowchart of FIG. 6.

Figure 6:
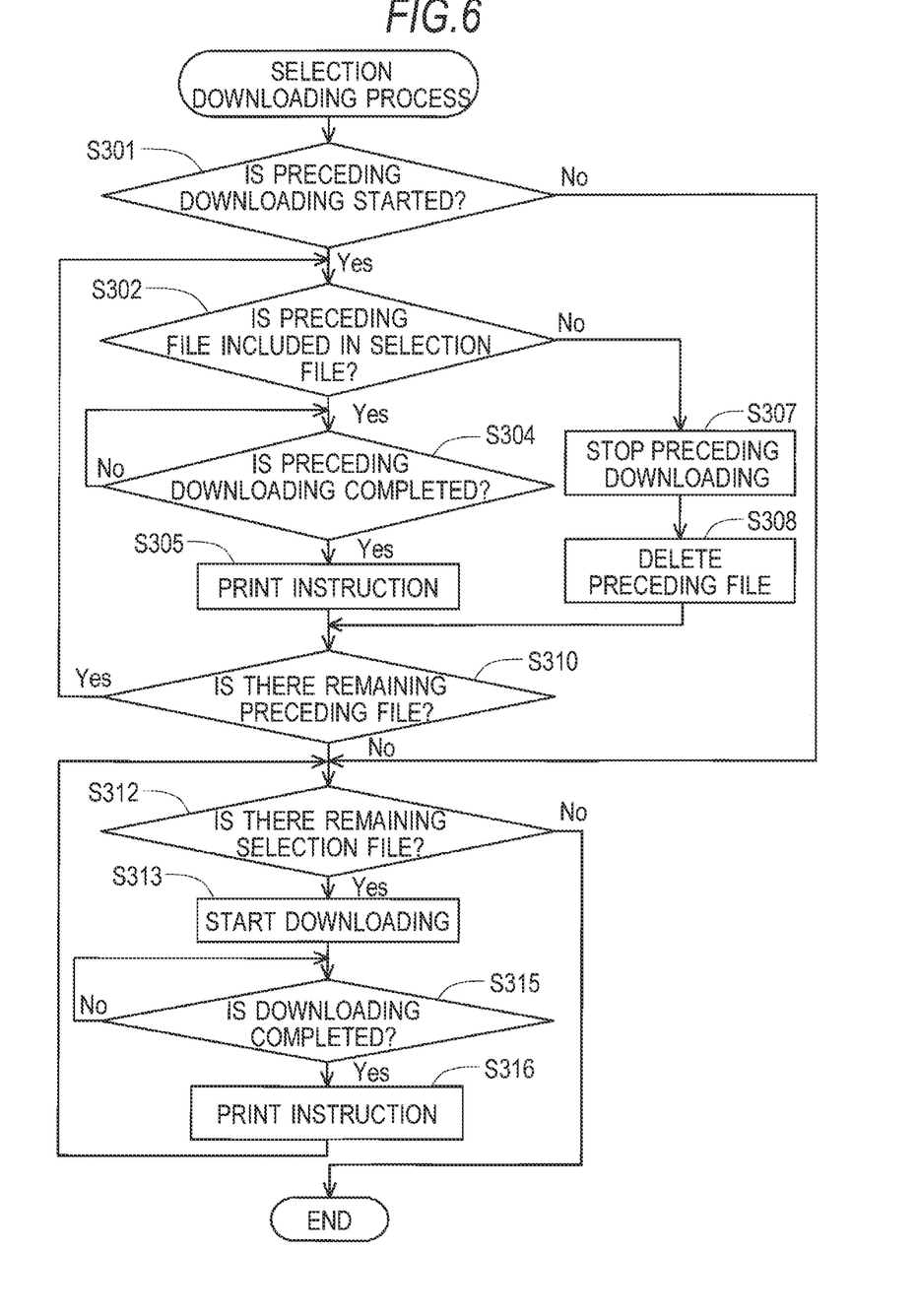
FIG. 6 is a flowchart showing the procedure of a selection downloading process.

Upon starting execution of the selection downloading process, the CPU 31 of the MFP 100 first determines whether preceding downloading has been started (S301). If preceding downloading is started in S104 of the first download printing process in FIG. 3 (S301: Yes), the following steps are executed for each file that becomes a target of preceding downloading up to that time. For example, assume that the login user has five files FL1 to FL5 in the image storage server 300 and that, at the time of S302, downloading of the file FL1 is completed and downloading of the file FL2 is still in progress. In this case, the following steps are executed for each of the files FL1 and FL2 (the target of preceding downloading).

First, the CPU 31 determines whether a file of which preceding downloading has been started (preceding file) is included in files selected in S109 (selection file) (S302). If it is determined that the file of which preceding downloading has been started is included in the selection file (S302: Yes), the CPU 31 determines whether downloading of the file is completed (S304). If downloading of the file is not completed (S304: No), downloading is further continued until completion. If downloading of the file is completed (S304: Yes), the CPU 31 controls the image forming device 10 to start printing of that file (S305). The image forming device 10 performs printing as instructed. Upon completion of printing, the CPU 31 of the MFP 100 deletes image data from the RAM 33.

On the other hand, if it is determined that the file of which preceding downloading has been started is not included in the selection file (S302: No) and if downloading of the file is in progress, the CPU 31 stops downloading (S307). If downloading of the file is already completed, the CPU 31 skips S307. Further, the CPU 31 starts deleting downloaded image data from the RAM 33 (S308).

Subsequent to S305 or S308, the MFP 100 determines whether there is another file of which preceding downloading has been started (S310). If it is determined that there is another file of which preceding downloading has been started (S310: Yes), the CPU 31 returns to S302 and determines whether that file is included in the selection file.

On the other hand, if preceding downloading is not started (S301: No) or if it is determined that there is no other file of which preceding downloading has been started (S310: No), the CPU 31 determines whether there is another selection file (S312). If there is another selection file of which downloading has not been performed (S312: Yes), the CPU 31 starts downloading of that remaining selection file (S313).

Then, the CPU 31 determines whether downloading is completed (S315). If downloading is not completed (S315: No), the CPU 31 continues downloading until completion. If downloading is completed (S315: Yes), the CPU 31 controls the image forming device 10 to perform printing (S316). Then, returning to S312, the CPU 31 determines whether there still remains a selection file. If there is no remaining selection file (S312: No), the selection downloading process ends.

Returning to the first download printing process in FIG. 3, since processing of all the files selected in S115 is finished, the CPU 31 determines whether printing by the image forming device 10 is finished (S116). If printing is not finished (S116: No), the CPU 31 waits for the end of printing. If printing is finished (S116: Yes), the first download printing process ends.

In the download printing process of the first embodiment, after logging in to the image storage server 300, the MFP 100 starts preceding downloading without waiting for selection by the user. Accordingly, it is expected that downloading is already started at a time point when an input of a print instruction of a file is received from the user. Hence, when download printing is performed, it is expected to shorten waiting time of the user before start of printing and to obtain a print output in a short time.

Figure 7:
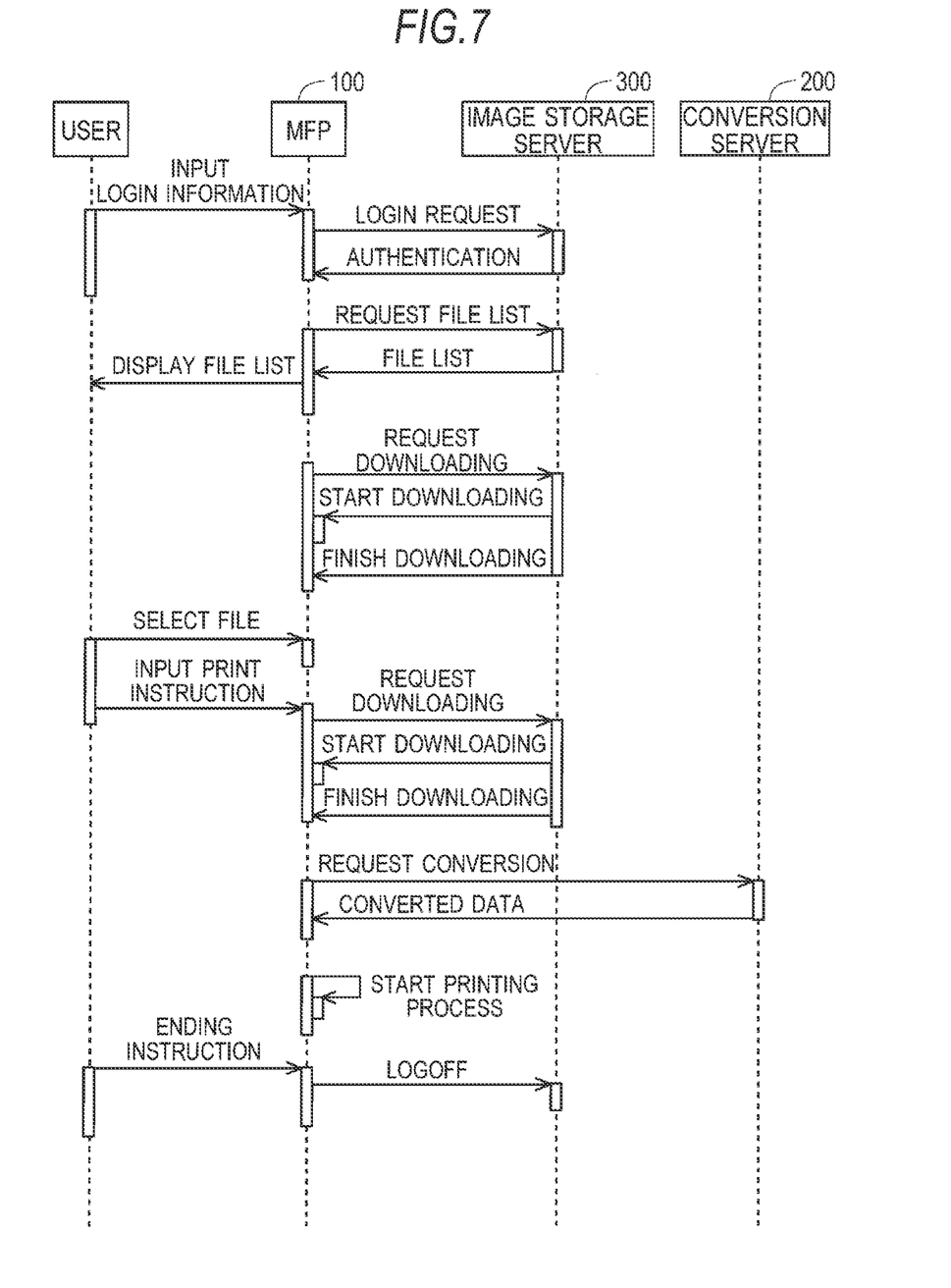
FIG. 7 is a sequence chart showing the procedure of second download printing.

Next, the procedure of download printing executed by the MFP 100 according to a second embodiment will be described while referring to the sequence chart of FIG. 7. In FIG. 7, only timing of starting preceding downloading is somewhat different from that of the first embodiment shown in FIG. 2, and the other parts are the same as FIG. 2.

In the second embodiment, after establishing communication by a login process, the MFP 100 requests the image storage server 300 to transmit a file list. Then, the MFP 100 acquires the file list and displays the file list. Subsequently, the MFP 100 starts preceding downloading without waiting selection input by a user. Files of which preceding downloading is performed are files included in the file list. For example, files may be sequentially downloaded in accordance with a display sequence of the file list. Here, the display sequence is a sequence in which files are displayed.

After that, the MFP 100 receives selection of a file and an input of a print instruction by the user. Subsequent procedure is the same as that of the first embodiment.

Figure 8:
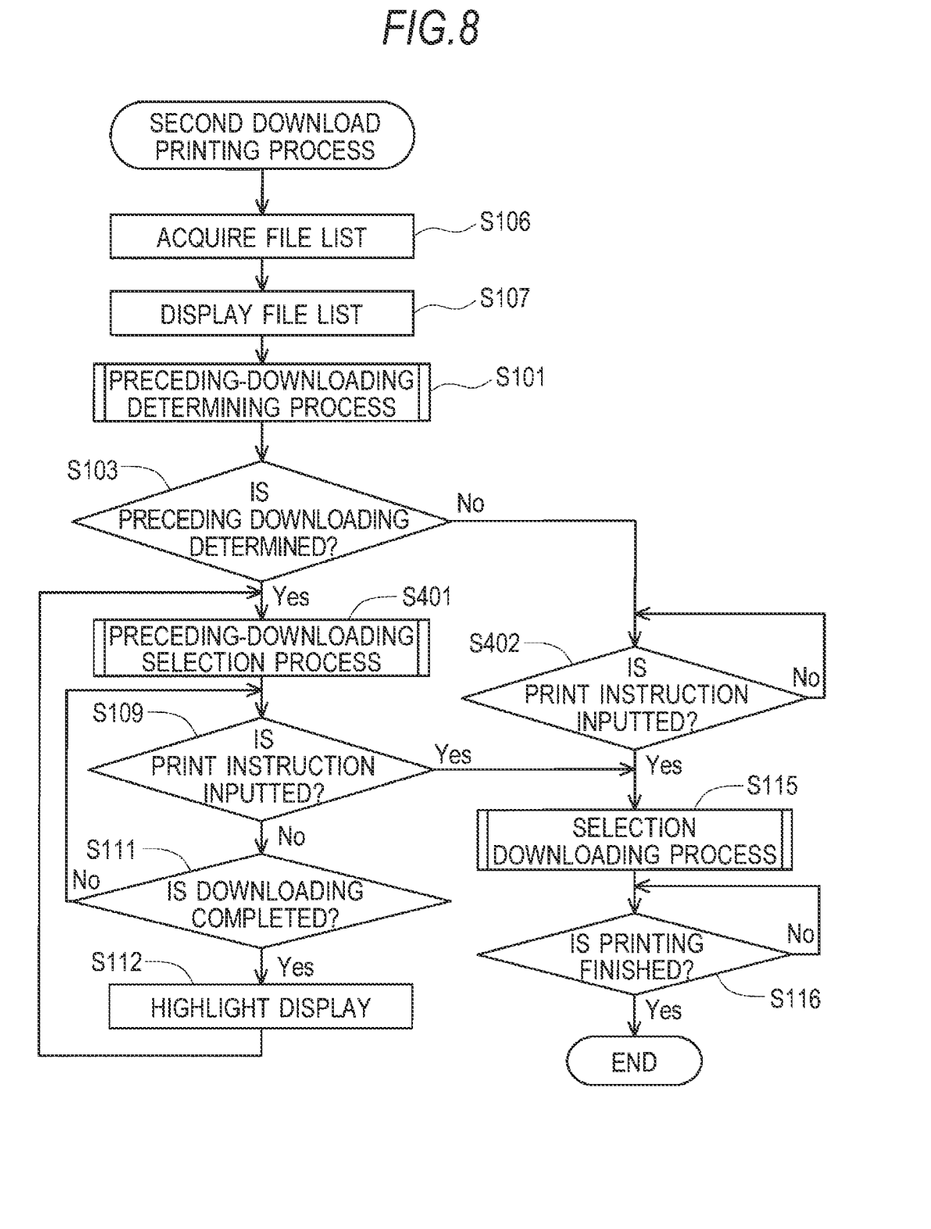
FIG. 8 is a flowchart showing the procedure of a second download printing process.

Next, the procedure of a second download printing process, which is a download printing process of the second embodiment, will be described while referring to the flowchart of FIG. 8. Timings of acquisition of a file list and start of preceding downloading in the second download printing process are different from those in the first download printing process. The same parts and steps as those of the first download printing process are designated by the same reference numerals to avoid duplicating description.

Upon starting the second download printing process, first, the CPU 31 of the MFP 100 requests the image storage server 300 to transmit a file list, and acquires the file list (S106). Then, the CPU 31 controls the operation panel 40 to display the acquired file list (S107). The file list includes a filename and a property of each file.

Here, the property of each file includes a color setting, an image size, a number of pages, and resolution, for example. Further, the property of each file may include a data amount of a file. If the property of each file does not include a data amount of a file, the MFP 100 infers a data amount from the property of a file. For example, data amount can be inferred from at least one of the image size, the number of pages, and the resolution.

Subsequently, the CPU 31 executes the preceding-downloading determining process for determining whether to start downloading (S101). Then, the CPU 31 determines whether it is determined that preceding downloading is to be performed (S103). If it is determined that preceding downloading is to be performed (S103: Yes), the CPU 31 executes a preceding-downloading selection process for determining a file of which preceding downloading is to be started, based on a property of image data (S401). The procedure of the preceding-downloading selection process, which is executed in S401, will be described while referring to the flowchart of FIG. 9.

Figure 9:
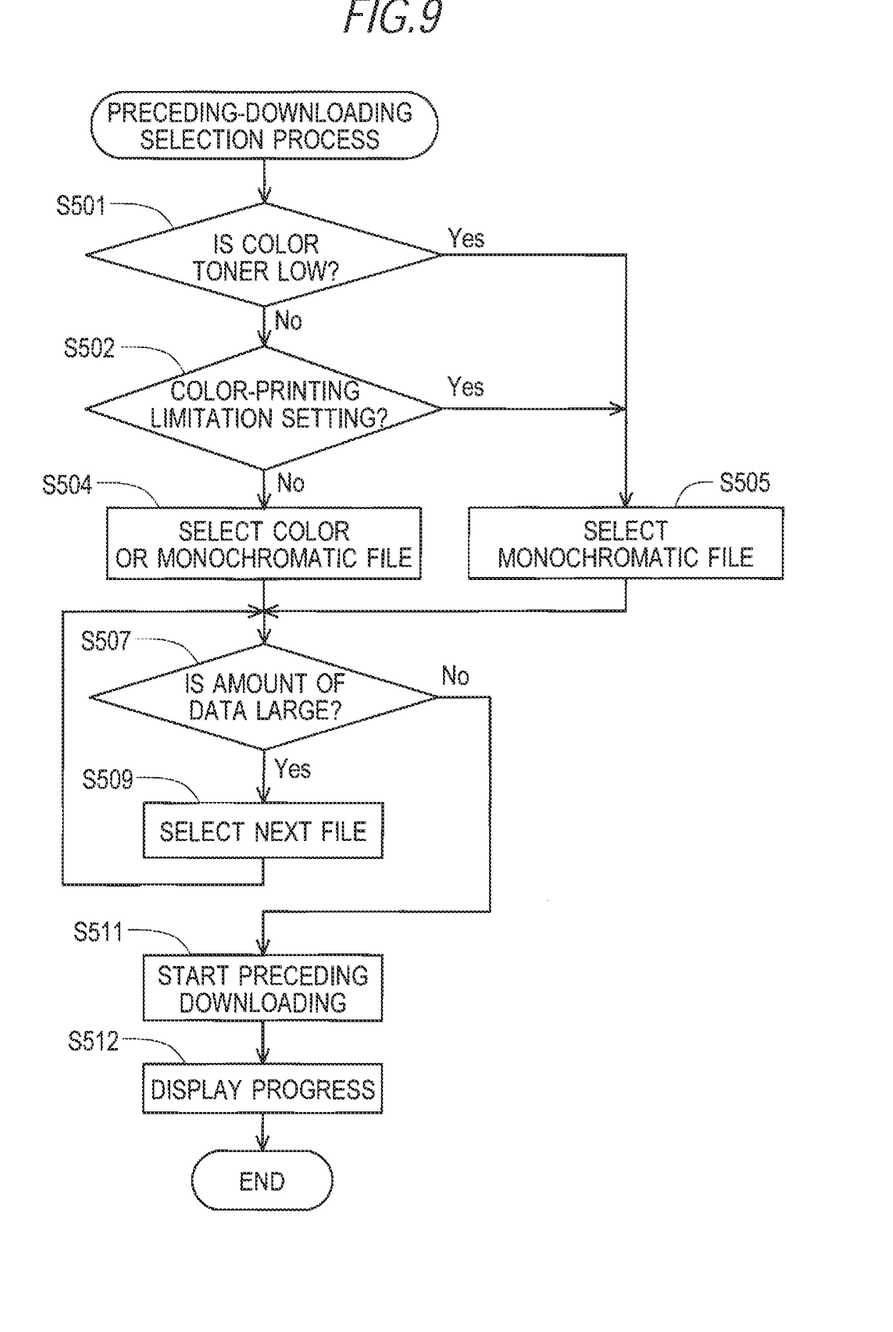
FIG. 9 is a flowchart showing the procedure of a preceding-downloading selection process.

Upon starting the preceding-downloading selection process, the CPU 31 of the MFP 100 determines whether the MFP 100 is in a remaining-amount error state of color toner (S501). In a case where a remaining amount of toner falls below a limit amount, the MFP 100 becomes the remaining-amount error state and displays alarm. Further, in the remaining-amount error state, printing by using toner of which the remaining amount falls below the limit amount is not performed. That is, in the remaining-amount error state of color toner, the MFP 100 does not perform color printing. If the MFP 100 is not in the remaining-amount error state of color toner (S501: No), the CPU 31 determines whether a setting of the MFP 100 is a color-printing limitation setting (S502). If color printing is restricted as the setting of the MFP 100 or if the login user is not authorized to perform color printing, the CPU 31 determines that the setting of the MFP 100 is a color-printing limitation setting (S502: Yes).

If it is determined that the setting of the MFP 100 is not a color-printing limitation setting (S502: No), the CPU 31 selects the first file in the file list (S504). Here, both of a color image and a monochromatic image can be selected as a file of which preceding downloading is to be performed. That is, in a process of selecting a file of which preceding downloading is to be performed, the color setting of the file is not considered. Note that the MFP 100 can obtain the color setting of a file, from the property of each file, based on the file list acquired in S106 of FIG. 8.

On the other hand, if it is determined that the MFP 100 is in the remaining-amount error state of color toner (S501: Yes) or if it is determined that the setting of the MFP 100 is a color-printing limitation setting (S502: Yes), the CPU 31 selects the first file of a monochromatic image in the file list (S505). Here, a file of which preceding downloading is performed is limited to a monochromatic image. That is, in a process of selecting a file of which preceding downloading is performed, the color setting of the file is considered, and a color image (that is, not monochromatic image) is not selected.

Next, the CPU 31 determines whether the file selected in S504 or S505 has a large data amount (S507). The CPU 31 of the MFP 100 acquires or infers the data amount of the file based on the property of the file. For example, the CPU 31 determines whether the acquired data amount is larger than a reference data amount that is preliminarily stored. If it is determined that the file has a large data amount (S507: Yes), the CPU 31 does not select the file as a target of preceding downloading, and selects a file which is the next candidate (S509). If the selection step in S509 is executed after step S504 is executed, a file is selected regardless of color setting. If the selection step in S509 is executed after step S505 is executed, only a file of a monochromatic image is selected.

If it is determined that the file does not have a large data amount (S507: No), the CPU 31 starts preceding downloading of the file (S511). Further, the CPU 31 shows, in the displayed file list, a progress display that indicates that preceding downloading has been started (S512). The progress display will be described later. Then, the preceding-downloading selection process ends. Note that if no file suitable for preceding downloading is selected, preceding downloading is not performed. In this way, image data of the target of preceding downloading is determined after a property (outline data) is received. Thus, it is possible to avoid downloading of image data that is not suitable for preceding downloading, such as image data that is not printable and image data having a large data size.

Returning to FIG. 8, after the preceding-downloading selection process in S401 is finished, the process advances to S109 and the CPU 31 waits for an input of a print instruction. If no print instruction is received (S109: No), the CPU 31 waits for an input of a print instruction (S109) and completion of downloading (S111), in the same manner as S109 and subsequent steps in the first download printing process. If a print instruction is received (S109: Yes), the CPU 31 executes the selection downloading process (S115) and waits for an end of printing (S116), in the same manner as the first download printing process.

On the other hand, in the second download printing process, when downloading is completed (S111: Yes) and highlight display is performed (S112), the process returns to S401. Then, the CPU 31 again executes the preceding-downloading selection process, and selects the next file of which preceding downloading is to be performed.

Figure 10:
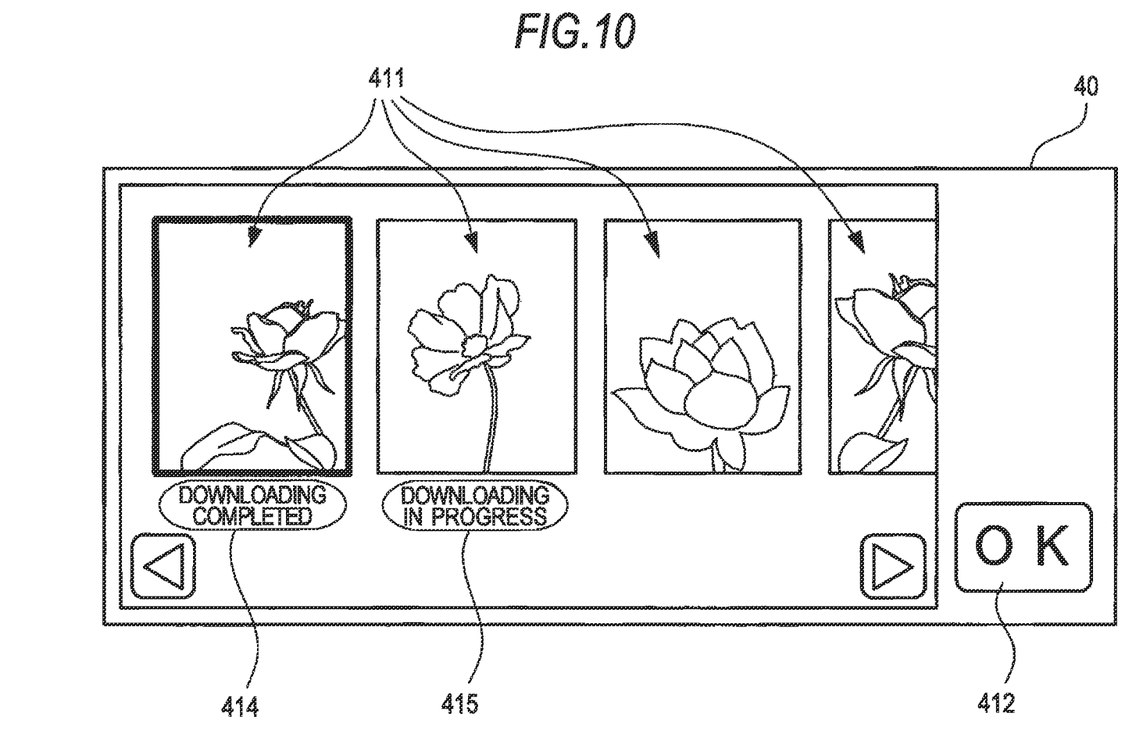
FIG. 10 is a screenshot showing an example of progress display and highlight display.

FIG. 10 shows a display example of a file list including the highlight display of S112 and the progress display of S512. This example is a display example of a file list of thumbnails 411, which is similar to an example of the first embodiment shown in FIG. 5. In FIG. 10, a mark 414 displayed as "DOWNLOADING COMPLETED" is shown at the lower side of the thumbnail 411 of which preceding downloading of the file is completed. Further, a mark 415 displayed as "DOWNLOADING IN PROGRESS" is shown at the lower side of the thumbnail 411 of which preceding downloading of the file has been started and not completed. With this display, a progress status of preceding downloading can be notified to the user.

Further, in the second download printing process, the file list is displayed in S107. Hence, if it is determined in S103 that preceding downloading is not to be performed (S103: No), the CPU 31 determines whether an input of a print instruction has been received (S402). Step S402 is the same determination as S109. If it is determined that an input of a print instruction has not been received (S402: No), the CPU 31 waits until an input of a print instruction is received. If an input of a print instruction has been received (S402: Yes), the process advances to S115, which is the same as the case of Yes in S109.

In the second embodiment, the MFP 100 acquires a file list from the image storage server 300, obtains color settings and data amounts of files, and selects a file of which preceding downloading is to be performed. Accordingly, it is not likely that preceding downloading is performed for image data that cannot be printed immediately and for image data that may occupy a large part of the storage area of the RAM 33.

As described above in detail, the MFP 100 of the present embodiment performs a login procedure for establishing communication (connection) between the MFP 100 itself and the image storage server 300. Further, the MFP 100 starts downloading of image data at timing after login and before receiving a print instruction of download printing which is downloading image data stored in the image storage server 300 and printing the image data. That is, downloading of image data is started without receiving selection input of image data to be printed. Accordingly, if a print instruction is received for a file of which preceding downloading has been started, downloading is completed in a short time and hence it is likely that printing can be started in a short time. Hence, it is expected to shorten waiting time of a user before start of printing, when download printing is performed.

While the invention has been described in detail with reference to the above aspects thereof, it would be apparent to those skilled in the art that various changes and modifications may be made therein without departing from the scope of the claims.

For example, in addition to the MFP, the invention can be applied to an apparatus having a communication function and an image forming function, such as a copier and a facsimile apparatus.

Further, in the above-described embodiments, communication is established by a login process. However, communication with the image storage server 300 may be established without authentication. For example, the MFP 100 may only transmit, to the image storage server 300, information for notifying that the MFP 100 is in a state where transmission and reception can be performed. Or, if it is possible to notify the image storage server 300 that the MFP 100 is in a state where communication can be performed only by transmitting a downloading request, the procedure of an establishing process may be included in the downloading request.

Further, in the above-described embodiments, the establishing process includes identifying the user who uses the image storage server 300. However, it is not always necessary that the user be identified. In a case where the user is not identified, image data of the target of preceding downloading may be all image data stored in the image storage server 300.

Further, for example, the preceding-downloading determining process may be omitted. That is, preceding downloading may be performed regardless of a state of the MFP 100. Further, in the above embodiment, in the preceding-downloading determining process, three conditions of a free area, a CPU load, and a communication speed are used as conditions for determination. However, determination may be made based on only one or two of these three conditions. Or, different conditions may be used.

Further, in the above-described embodiments, the preceding-downloading determining process is executed after communication is established. However, for example, the free area and the CPU load may be monitored constantly to preliminarily determine whether preceding downloading can be performed.

Further, in the above-described first embodiment, files of which preceding downloading is to be performed are determined without referring to the file list. However, for example, the second and subsequent files of which preceding downloading is to be performed may be determined by referring to the file list. In that case, the preceding-downloading selection process shown in FIG. 9 in the second embodiment may be executed.

Further, in the above-described embodiments, a file of which preceding downloading is completed is displayed in a highlighted manner. However, this highlight display may be omitted. Or, the highlight display may be performed for a file of which preceding downloading is started, in addition to a file of which preceding downloading is completed. The highlight display helps the user select a file, which is preferable. Further, in the first embodiment, the progress display may be also performed in addition to the highlight display. Further, as the progress display, a ratio of completion of downloading may be displayed. For example, the ratio of completion of downloading may be inferred based on an entire size of a file of which preceding downloading has been started and on a size of received data, and the ratio may be displayed with a number or a graph.

Further, in the selection downloading process in the above-described embodiment, if a file of which preceding downloading is in progress is not selected, preceding downloading is stopped and downloaded data of the file is deleted. However, after preceding downloading is stopped, the downloaded data may be kept until logout. Until logout, there remains a possibility that a file of which preceding downloading is performed is further selected. By keeping the downloaded data, when a print instruction of the file is received, printing can be started in a short time. In this way, if a print instruction is received for image data while downloading of other image data is in progress (that is, preceding downloading is in progress), downloading of the image data is started in a prioritized manner over the other image data.

Further, in the above-described embodiment, if an instruction for printing a file requiring a conversion process is received, the MFP 100 downloads a file from the image storage server 300 and subsequently transmits the file to the conversion server 200 for performing a conversion process. However, for example, if the image storage server 300 has a conversion function, that conversion function may be used. Or, the image storage server 300 may transmit image data to the conversion server 200, and the MFP 100 may download a file converted by the conversion server 200. Or, the image storage server 300 may transmit image data to the conversion server 200 for performing a conversion process, the conversion server 200 may return the converted file to the image storage server 300, and the MFP 100 may download the converted file from the image storage server 300.

Further, in the above-described embodiment, the ROM 32 stores control programs for controlling the MFP 100, whereas the RAM 33 stores image data received from the image storage server 300. However, the control programs and the image data may be stored in the same memory (for example, the NVRAM 34).

Further, in the above-described embodiment, in S201 of FIG. 4, the CPU 31 determines whether the free area of the RAM 33 exceeds the limit free area that is preliminarily determined and stored (a constant value). However, the limit free area may be a variable that varies depending on a size of image data.

Further, in the above-described embodiment, in FIG. 9, the CPU 31 of the MFP 100 determines whether the MFP 100 is in a remaining-amount error state of color toner (S501) and whether a setting of the MFP 100 is a color-printing limitation setting (S502). If a determination result in S501 or 502 is Yes, image data using color toner is excluded from preceding downloading. Alternatively, preceding downloading of image data using color toner may be performed after preceding downloading of image data using monochromatic toner is performed.

Similarly, in the above-described embodiment, in FIG. 9, the CPU 31 of the MFP 100 determines whether the file selected in S504 or S505 has a large data amount (S507). If a determination result in S507 is Yes, the file having a large data amount is excluded from preceding downloading. Alternatively, preceding downloading of a file having a large data amount may be performed after preceding downloading of a file having a small data amount is finished.

The processes disclosed in the embodiment may be executed by hardware such as a single CPU, a plurality of CPUs, an ASIC etc., or a combination thereof. Further, the processes disclosed in the embodiment may be realized in various modes such as a storage medium storing program instructions for executing the processes, a method of executing the processes, and the like.

What is claimed is:

1. A printing apparatus comprising:
   an interface;
   a first memory;
   a printing device configured to perform printing based on image data stored in the first memory;
   a processor; and
   a second memory storing instructions, the instructions, when executed by the processor, causing the processor to perform:
      transmitting a first request to a server via the interface, the first request requesting the server to connect with the printing apparatus;
      establishing connection between the printing apparatus and the server;
      transmitting a second request to the server via the interface, the second request requesting the server to transmit image data stored in the server after connection with the server and before reception of a print instruction, the print instruction being an instruction for receiving image data stored in the server and for controlling the printing device to perform printing based on the image data;
      receiving image data stored in the server via the interface based on the second request;
      storing the received image data in the first memory;
      receiving the print instruction via the interface;
      determining whether the image data stored in the first memory is included in the image data for which the print instruction is received;
      in response to determination that the image data stored in the first memory is included in the image data for which the print instruction is received, controlling the printing device to perform printing based on the image data stored in the first memory; and
      in response to determination that the image data stored in the first memory is not included in the image data for which the print instruction is received,
         transmitting a third request to the server via the interface, the third request requesting the server to transmit the image data for which the print instruction is received, and
         controlling the printing device to perform printing based on the image data for which the print instruction is received, after receiving the image data from the server.

2. The printing apparatus according to claim 1, wherein, when executed by the processor, the instructions cause the processor to perform:
   in response to reception of the print instruction for first image data at timing after start of reception of second image data and before completion of reception of the second image data, stopping reception of the second image data and starting reception of the first image data.

3. The printing apparatus according to claim 1, wherein the interface comprises a display device configured to receive an operation input and to display information; and
   wherein, when executed by the processor, the instructions cause the processor to perform:
      transmitting a fourth request to the server via the interface, the fourth request requesting the server to transmit a list of image data;

after receiving the list of image data, displaying the list of image data on the display device;

receiving, through the display device, a selection of image data from the list of image data;

receiving the print instruction of image data selected through the display device;

in response to determination that the image data selected through the display device includes image data of which reception from the server is in progress, continuing reception of the image data of which reception is in progress; and in response to determination that the image data selected through the display device does not include the image data of which reception is in progress, stopping reception of the image data of which reception is in progress.

4. The printing apparatus according to claim 1, wherein, when executed by the processor, the instructions cause the processor to perform:

determining whether a condition is satisfied;

in response to determination that the condition is satisfied, starting reception of the image data before receiving the print instruction; and in response to determination that the condition is not satisfied, starting reception of the image data after receiving the print instruction.

5. The printing apparatus according to claim 4, wherein the condition is that a free area of the first memory is larger than a limit free area.

6. The printing apparatus according to claim 4, wherein the condition is that a load of the processor is lower than a limit load.

7. The printing apparatus according to claim 4, wherein the condition is that a communication speed between the printing apparatus and the server is lower than a limit speed.

8. The printing apparatus according to claim 1, further comprising a display, wherein, when executed by the processor, the instructions cause the processor to perform:

after start of reception of the image data based on the second request, controlling the display to display progress of reception of the image data.

9. The printing apparatus according to claim 8, wherein, when executed by the processor, the instructions cause the processor to perform:

after completion of reception of the image data, controlling the display to display an indication that reception of the image data is completed.

10. The printing apparatus according to claim 1, wherein, when executed by the processor, the instructions cause the processor to perform:

deleting, from the first memory, image data that is received from the server, in response to determination that no print instruction is received for the image data.

11. The printing apparatus according to claim 1, wherein, when executed by the processor, the instructions cause the processor to perform:

after establishing the connection, receiving from the server a property of image data stored in the server; and determining image data to be received from the server, based on the property.

12. The printing apparatus according to claim 11 wherein the property includes color information of image data; and wherein, when executed by the processor, the instructions cause the processor to perform:

determining a color used in image data based on the color information; and transmitting a fifth request to the server via the interface, the fifth request requesting the server to transmit image data that does not use a restricted color, out of image data stored in the server.

13. The printing apparatus according to claim 12, wherein, when executed by the processor, the instructions cause the processor to perform:

determining whether an amount of colorant of a predetermined color is smaller than a limit amount; and in response to determination that the amount of colorant of the predetermined color is smaller than the limit amount, transmitting a sixth request to the server via the interface, the sixth request requesting the server to transmit image data that does not use the predetermined color, out of image data stored in the server.

14. The printing apparatus according to claim 11, wherein the property includes size information of image data; and wherein, when executed by the processor, the instructions cause the processor to perform:

determining a size of image data based on the size information; and transmitting a seventh request to the server via the interface, the seventh request requesting the server to transmit image data of which the size is smaller than a threshold value, out of image data stored in the server.

15. The printing apparatus according to claim 1, wherein, when executed by the processor, the instructions cause the processor to perform:

receiving image data stored in the server at timing after establishment of the connection and before reception of the print instruction, in a sequence of date and time at which image data are updated, such that the image data updated most recently is first in the sequence.

16. The printing apparatus according to claim 1, wherein, when executed by the processor, the instructions cause the processor to perform:

determining whether the image data for which the print instruction is received includes the image data of which reception is started;

in response to determination that the image data for which the print instruction is received includes the image data of which reception is started, controlling, after the reception is finished, the printing device to perform printing based on the image data of which reception is started and the print instruction is received; and in response to determination that the image data for which the print instruction is received does not include the image data of which reception is started, stopping reception of the image data of which reception is started, and controlling the printing device to perform printing based on the image data for which the print instruction is received.

17. A method of controlling a printing apparatus to perform printing based on image data stored in a server, the printing apparatus having an interface, a memory, and a printing device, the method comprising:

transmitting a first request to the server via the interface, the first request requesting the server to connect with the printing apparatus;

establishing connection between the printing apparatus and the server;

transmitting a second request to the server via the interface, the second request requesting the server to transmit image data stored in the server after connection with the server and before reception of a print instruction, the print instruction being an instruction for receiving image data stored in the server and for controlling the printing device to perform printing based on the image data;

receiving image data stored in the server via the interface based on the second request;

storing the received image data in the memory;

receiving the print instruction via the interface;

determining whether the image data stored in the memory is included in the image data for which the print instruction is received;

in response to determination that the image data stored in the memory is included in the image data for which the print instruction is received, controlling the printing device to perform printing based on the image data stored in the memory; and in response to determination that the image data stored in the memory is not included in the image data for which the print instruction is received,
- transmitting a third request to the server via the interface, the third request requesting the server to transmit the image data for which the print instruction is received, and
- controlling the printing device to perform printing based on the image data for which the print instruction is received, after receiving the image data from the server.

18. A non-transitory computer-readable storage medium storing computer-readable instructions executable by a processor of a printing apparatus connected with a server, the printing apparatus having an interface, a memory, and a printing device, the computer-readable instructions, when executed by the processor, causing the processor to perform:

transmitting a first request to the server via the interface, the first request requesting the server to connect with the printing apparatus;

establishing connection between the printing apparatus and the server;

transmitting a second request to the server via the interface, the second request requesting the server to transmit image data stored in the server after connection with the server and before reception of a print instruction, the print instruction being an instruction for receiving image data stored in the server and for controlling the printing device to perform printing based on the image data;

receiving image data stored in the server via the interface based on the second request;

storing the received image data in the memory;

receiving the print instruction via the interface;

determining whether the image data stored in the memory is included in the image data for which the print instruction is received;

in response to determination that the image data stored in the memory is included in the image data for which the print instruction is received, controlling the printing device to perform printing based on the image data stored in the memory; and in response to determination that the image data stored in the memory is not included in the image data for which the print instruction is received,
- transmitting a third request to the server via the interface, the third request requesting the server to transmit the image data for which the print instruction is received, and
- controlling the printing device to perform printing based on the image data for which the print instruction is received, after receiving the image data from the server.

* * * * *